United States Patent
Welle et al.

(10) Patent No.: US 7,767,931 B1
(45) Date of Patent: Aug. 3, 2010

(54) ULTRASHORT-PULSE LASER GENERATED NANOPARTICLES OF ENERGETIC MATERIALS

(75) Inventors: Eric J. Welle, Niceville, NM (US); Alexander S. Tappan, Albuquerque, NM (US); Jeremy A. Palmer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 426 days.

(21) Appl. No.: 11/761,658

(22) Filed: Jun. 12, 2007

(51) Int. Cl.
*B23K 26/36* (2006.01)
(52) U.S. Cl. .................. 219/121.72
(58) Field of Classification Search ............ 219/121.68, 219/121.69, 121.61, 121.67, 121.78, 121.79
See application file for complete search history.

(56) References Cited

U.S. PATENT DOCUMENTS 6,150,630 A * 11/2000 Perry et al. ............ 219/121.68
6,559,413 B1 * 5/2003 Muenchausen et al. 219/121.72

OTHER PUBLICATIONS

G. Ausanio et al, "Magnetic and morphological characteristics of nickel nanoparticles films produced by femtosecond laser ablation", Appl. Phys. Lett. vol. 85, No. 18, Nov. 2004, pp. 4103-4105.*
F. Roeske et al, "Cutting and Machining Energetic Materials with a Femtosecond Laser", Propellants, Explosives, Pyrothechnics, vol. 28, No. 2, 2003, pp. 53-57.*
E. Welle et al, "Daimeter Effects on Detonation Performance of HNS and CL-20", 13$^{th}$ International Detonation Symposium, Norfork, VA, Jul. 23-28, 2006.*
J. Palmer et al, "An ultra-short pulse laser lathe for axisymmetric micromaching of explosives", SPIE Photonics West, Proceedins vol. 6460, San Jose, CA, Jan. 20-25, 2007; San Jose, CA, 2007.*
S. Amoruso et al, "Generation of silicon nanoparticles via femtosecond laser ablation in vacuum," Appl. Phys. Lett., vol. 84, No. 22, May 2004, pp. 4502-4504.
E.G. Gamaly "Ablation of solids by femtosecond lasers: Ablation mechanism and ablation thresholds for metals and dielectrics", American Institute of Physics (2002), Physics of Plasmas, vol. 9, No. 3, pp. 949-957.
Jeremy A. Palmer et al, "An ultra-short pulse laser lathe for axisymmetric micromachining of explosives", SPIE Photonics West, Proceedings vol. 6460, San Jose, CA, Jan. 20-25, 2007.
Danny Perez et al, "Molecular-dynamics study of ablation of solids under femtosecond laser pulses", The American Physical Society, Physical Review B 67, 184102 (2003), pp. 1084101-1 through 184102-15.
Danny Perez et al, "Ablation of Solids under Femtosecond Laser Pulses", The American Physical Society, Physical Review Letters, vol. 89, No. 25, Dec. 2002, pp. 255504-1 through 255504-4.

(Continued)

*Primary Examiner*—Tu B Hoang
*Assistant Examiner*—Thien Tran
(74) *Attorney, Agent, or Firm*—Carol I Ashby

(57) ABSTRACT

A process for generating nanoscale particles of energetic materials, such as explosive materials, using ultrashort-pulse laser irradiation. The use of ultrashort laser pulses in embodiments of this invention enables one to generate particles by laser ablation that retain the chemical identity of the starting material while avoiding ignition, deflagration, and detonation of the explosive material.

13 Claims, 6 Drawing Sheets

OTHER PUBLICATIONS

M. D. Perry et al, "Ultrashort-pulse laser machining of dielectric materials", American Institute of Physics, Journal of Applied Physics, vol. 85, No. 9, May 1999, pp. 6803-6810.

Frank Roeske, et al, "Cutting and Machining Energetic Materials with a Femtosecond Laser", Propellants, Explosives, Pyrotechnics, vol. 28, No. 2, 2003, pp. 53-57.

Leonid V. Zhigilei, et al "Microscopic mechanisms of laser ablation of organic solids in the thermal and stress confinement irradiation regimes", American Institute of Physics, Journal of Applied Physics, vol. 88, No. 3, Aug. 2000, pp. 1281-1298.

Eric J. Welle et al, "Diameter Effects on Detonation Performance of HNS and CL-20", 13th International Detonation Symposium, Norfolk, VA, Jul. 23-28, 2006.

L. Jiang et el, "Plasma modeling for ultrashort pulse laser ablation of dielectrics", American Institute of Physics, Journal of Applied Sciences, vol. 100, 2006, pp. 023116-1 through 023116-7.

* cited by examiner

# ULTRASHORT-PULSE LASER GENERATED NANOPARTICLES OF ENERGETIC MATERIALS

The United States Government has rights in this invention pursuant to Department of Energy Contract No. DE-AC04-94AL85000 with Sandia Corporation.

BACKGROUND OF THE INVENTION

This invention relates to a method of forming very small particles of explosive materials. More specifically, it relates to using ultrashort laser pulses to generate energetic nanoparticles. Particles with sizes in the nanometer to micrometer range are highly reactive due to their very large surface-to-volume ratio. There is a need for a method of forming such small particles using a technique that does not produce ignition (initiation of combustion), deflagration (combustion with subsonic flame propagation), or detonation (supersonic combustion with propagating shock wave) when working with highly energetic materials, such as explosives. Standard chemical processes generally do not produce explosives of high purity at particle sizes below a few micrometers.

Avoidance of deflagration or detonation of energetic materials requires exclusion of a source of ignition. Common sources of ignition include thermal sources, electrical sources, and mechanical sources. Many common methods for forming small particles, such as grinding, can lead to ignition, deflagration, and potentially detonation. To avoid deflagration or detonation of energetic materials during the formation of nanoparticles of the material, it is very desirable to employ a method that minimizes exposure to such potential ignition sources. The light-based method of this invention satisfies this need.

Laser machining of explosives has been reported. In general, in machining applications, the production of solid residues such as particles is an undesirable byproduct of the machining process. Therefore, laser machining processes that can produce primarily gas-phase final products, especially chemically inert or nontoxic ones, are especially desirable. Perry et al. report a method for rapid machining with essentially no heat or shock affected zone. In their method, material is removed by a non-thermal mechanism. A combination of multiphoton and collisional ionization creates a critical density plasma in a time scale much shorter than electron kinetic energy is transferred to the lattice. The material is converted from its initial solid state directly into a fully ionized plasma on a time scale too short for thermal equilibrium to be established with the lattice. Hydrodynamic expansion of the plasma eliminates the need for additional techniques to remove material. The material which is removed is rendered inert. The laser pulse converts the explosive material from the solid state to the plasma state; the explosive material is removed from the solid by hydrodynamic expansion of the plasma, wherein the plasma consists of inert gases and no toxic vapor. (M. E. Perry, B. C. Stuart, P. S. Banks, B. R. Myers, and J. A. Sefcik, "Laser Machining of Explosives," U.S. Pat. No. 6,150,630) Perry et al. reports the use of pulse durations of 5 femtoseconds to 50 picoseconds and fluences that produce a fully ionized plasma for various embodiments of their invention. Peak irradiances greater than $10^{12}$ W/cm$^2$ are used. They state that any wavelength laser source can be used provided the beam is focused to achieve a peak irradiance (Watts/cm$^2$) high enough to produce an ionized plasma in vacuum.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

Figure 1:
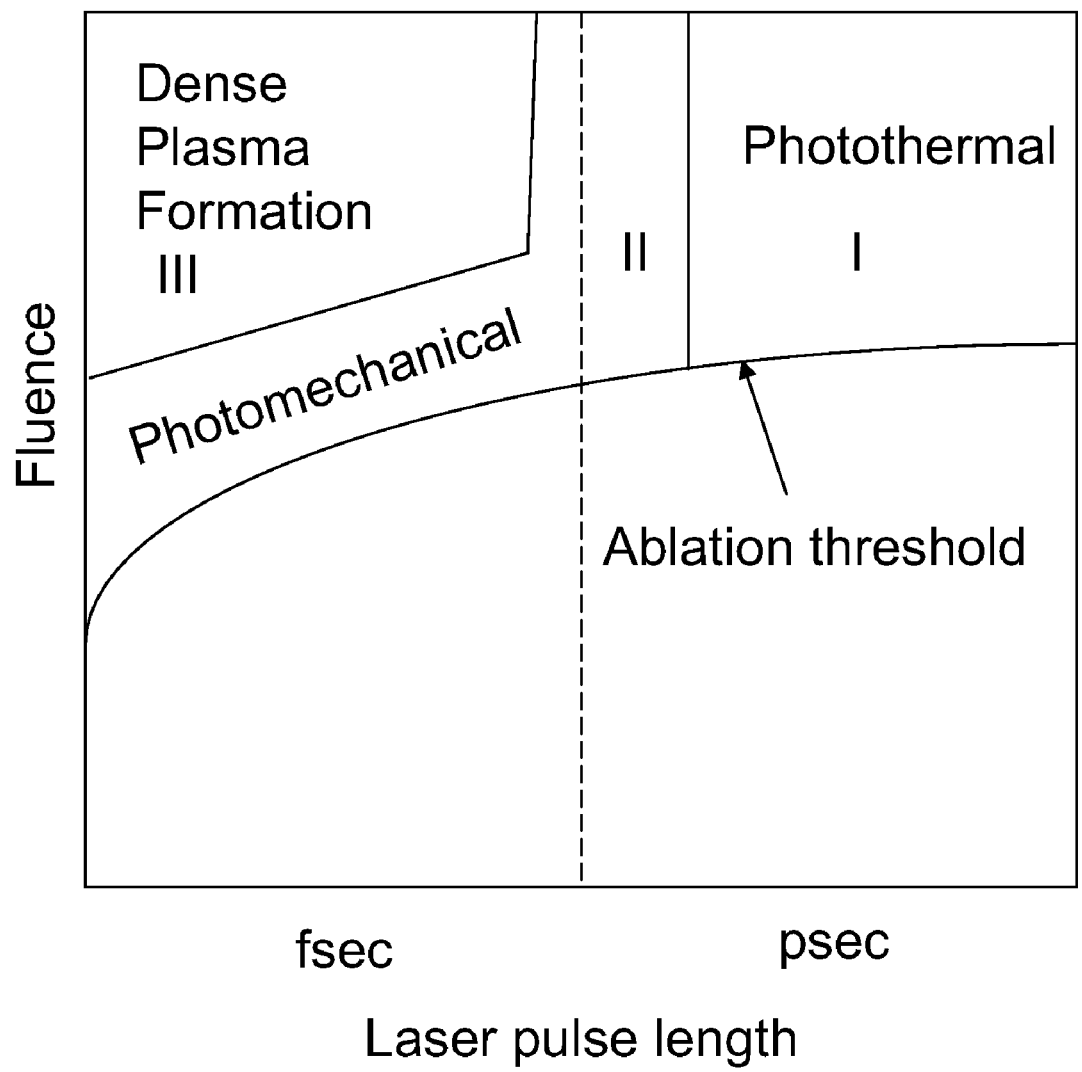
FIG. 1 illustrates qualitatively the three main mechanistic regimes for ablation using short or ultrashort laser pulses.

This invention comprises a method for forming nanoparticles and microparticles of energetic materials, such as explosive materials, wherein the original chemical composition of the macroscale starting material is substantially retained.

Ultrashort-pulse laser ablation is used in embodiments of this invention to product nanoparticles of explosive materials without the attendant risk of deflagration or detonation. A serious problem can arise when irradiating an explosive or similar energetic material with laser pulses of many-picosecond or nanosecond durations. Under such longer pulses, deflagration or detonation of the explosive material will frequently result due to the excessive rise in the lattice temperature of the explosive material. The use of ultrashort laser pulses in embodiments of this invention enables one to generate particles by laser ablation that retain the chemical identity of the starting material while avoiding ignition, deflagration, and detonation of the explosive material.

Previous applications of femtosecond lasers to ablation of explosives have been directed at cleanly machining structures in components comprising explosive materials without igniting the explosive and preferably without generating explosive material residue in the process. Consequently, laser fluences for these machining process are chosen to be high enough that the ablating material is converted into a fully ionized plasma, with the resulting products of the ablation process being nontoxic, non-hazardous species such as elemental carbon, and inert or simple gases.

In contrast, embodiments of this invention employ fluences that are deliberately chosen to substantially avoid the formation of a dense plasma where the molecules are highly dissociated into constituent elements during the laser pulse. Avoiding such plasma conditions is needed so that the chemical identity of the energetic material can be retained and nanoparticles of the original material can be generated. Any significant plasma contributions to the process should be from plasmas that may involve ionized molecular species but that do not predominantly decompose the starting materials so as to lose the chemical identity of that material. The starting material can be in the form of a crystalline solid, a powder, a pellet, a film, or some other solid form.

The chemical identity of the starting material is substantially retained in the nanoparticle product. It is to be noted that we use the term nanoparticle to include nanometer scale particles and particles of a few micrometers in size. Due to the ablative nature of the process, a range of particle sizes are generally produced in a given embodiment.

In various embodiments, different atmospheric conditions may be used. A wide range of pressures are suitable for applications of this process. For example, ablation may be performed from atmospheric pressure down into the vacuum regime. In some embodiments, reduced pressures, such as pressures in the $10^{-6}$ Torr and above, up to atmospheric pressure may be used. The gas or gases comprising the atmosphere should be substantially non-reactive with the energetic material so that the chemical identity of the material may be retained during the process.

For embodiments of the present invention, retention of the original chemical identity of the energetic material is key, so avoidance of the process conditions predominantly producing plasma decomposition of the energetic material is desirable. The physics of the ablation of solids under femtosecond laser pulses has been modeled for fluences below those that produce primarily plasma products; computational results have been reported by D. Perez and L. J. Lewis (D. Perez and L. J. Lewis, "Molecular-dynamics study of ablation of solids under femtosecond laser pulses," Phys. Rev. B Vol. 67 (2003) pp. 184102-1 to 184102-15) and by Zhigilei and Garrison (L. V. Zhigilei and B. J. Garrison, "Microscopic mechanisms of laser ablation of organic solids in the thermal and stress confinement irradiation regimes," J. Appl. Phys. Vol. 88 (2000) pp. 1281-1298). Femtosecond laser ablation under high intensities ($10^{13}$-$10^{14}$ W/cm$^2$) where the ionization of the target material is complete before the end of the pulse (plasma formation) has been modeled by Gamaly et al. (E. G. Gamaly, A. V. Rode, B. Luther-Davies, and V. T. Tikhonchuk, "Ablation of solids by femtosecond lasers: Ablation mechanism and ablation thresholds for metals and dielectrics," Phys. of Plasmas Vol. 9 (2002) pp. 949-957).

For embodiments of this invention, it is desirable to operate the laser in a regime where the fluence is above the threshold fluence for ablation but below the threshold fluence for fully ionized plasma generation. Additionally, operation in a laser pulse-length regime that avoids excessive heating of the solid that might lead to deflagration or detonation is important. By so doing, the chemical identity of the material can retained in the nanoparticles produced by various embodiments.

The following discussion of the changes in the ablation process as a function of fluence will provide guidance to one skilled in the art in selecting process parameters that produce the desired product from an embodiment of this invention. FIG. 1 presents a schematic representation of the characteristic short-pulse laser ablation regions of importance in embodiments of this invention.

For some many-picosecond pulse lengths at fluences above the ablation threshold for a material, photothermal effects can dominate (region I in FIG. 1). Thermal confinement causes the formation of thermally vaporized material in the near-surface region. A fluence and pulse length combination fitting these conditions of 150 ps and 61 J/m$^2$ were modeled by Zhigilei and Garrison for a generic organic molecular solid. A foamy transient structure can form that decomposes into clusters that can develop into spheroidal liquid droplets that are ejected from the surface, the ejection being driven by the overheated gas. An alternative term for this process is phase explosion. Temperatures can rise well above the melting temperature Explosive ejection of a mixture of gas phase molecules and liquid droplets occurs. The relative amount of molecules and droplets depends on the degree of overheating during the pulse. The ejected plume rapidly cools, and nanoparticles may form. A concern when attempting to generate explosive nanoparticles in this mechanistic regime is whether the temperature for a given material might rise about a temperature where deflagration or detonation may be a problem. This is especially so for more sensitive explosive materials. However, operation in cooler portions of this regime may be acceptable for less sensitive materials. Thus, the maximum tolerable pulse length may be expected to vary for different materials.

Figure 2:
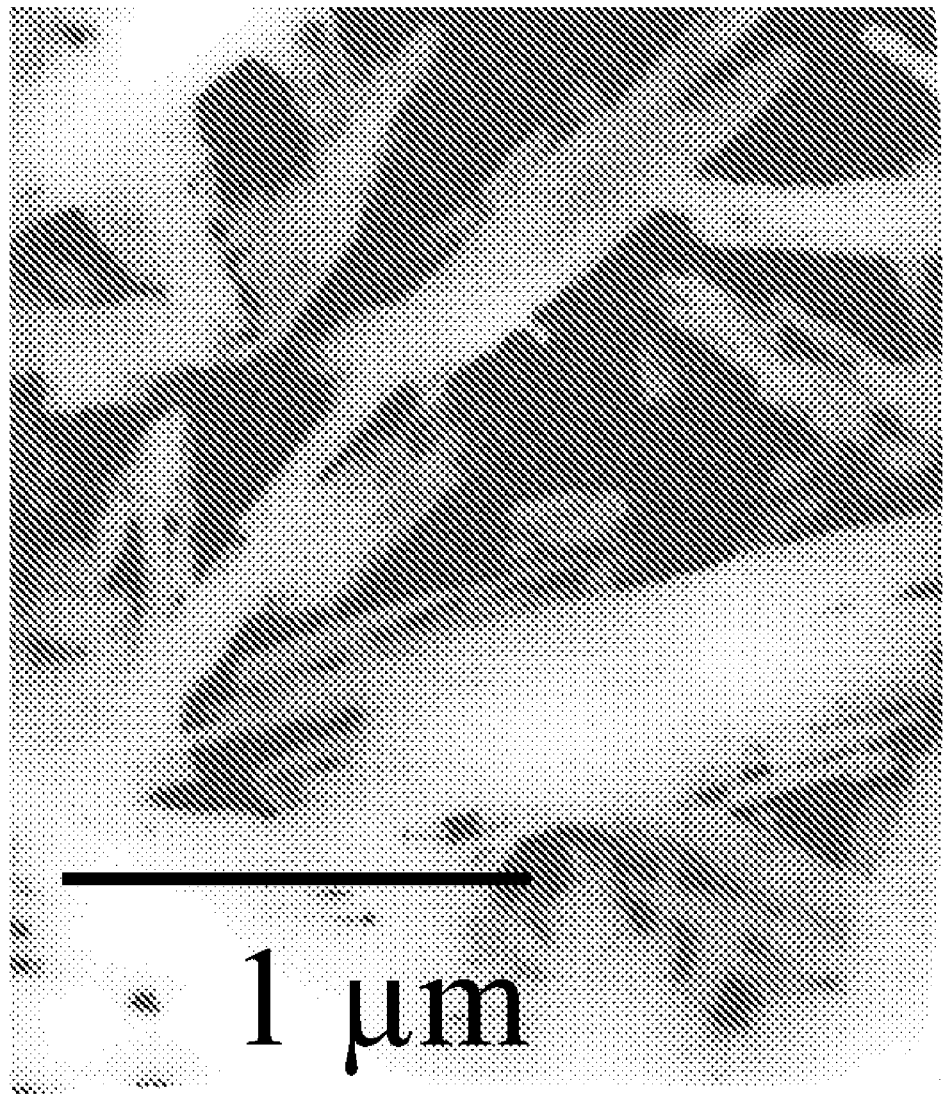
FIG. 2 presents a bright-field transmission electron micrograph (TEM) of HNS starting material.
Figure 3:
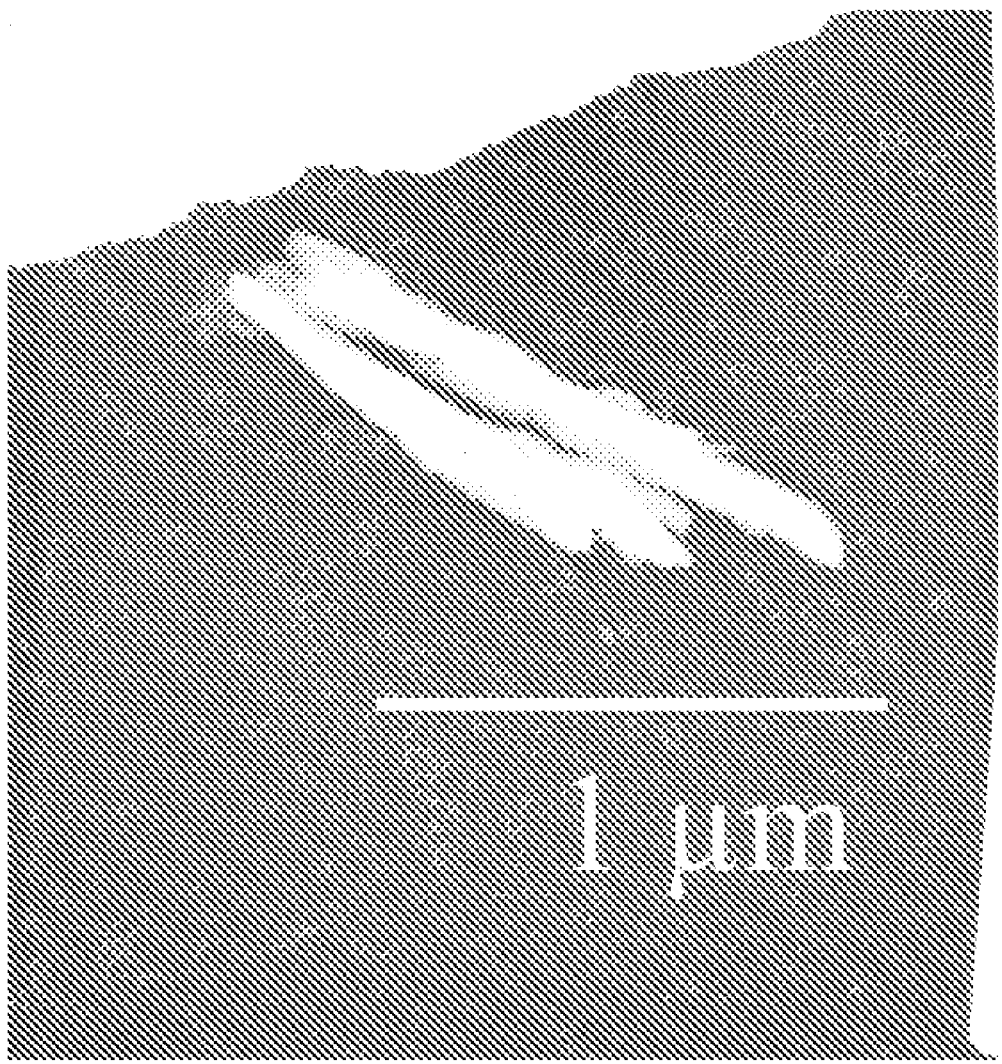
FIG. 3 presents a 200 kV bright-field TEM of nanocrystals of HNS generated by laser ablation in an embodiment of this invention.
Figure 4:
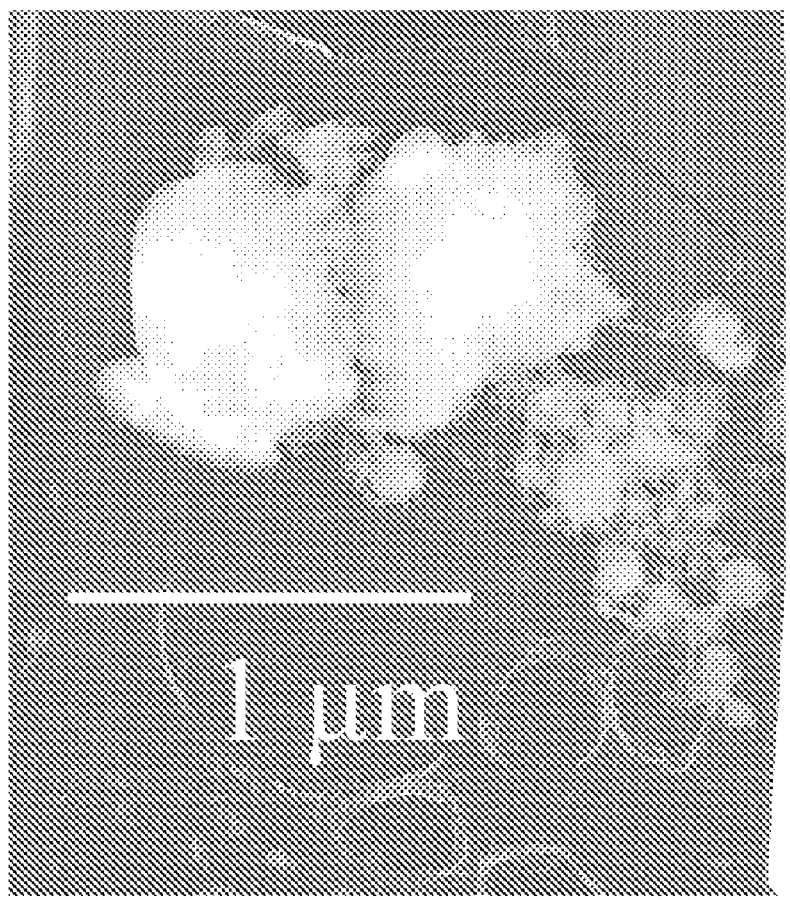
FIG. 4 presents a 200 kV bright-field TEM of nanoparticles of HNS generated by laser ablation in an embodiment of this invention.

A different mechanism becomes dominant at somewhat shorter pulse lengths, such as femtoseconds up to a few picoseconds. Photomechanical effects, such as stress confinement, become dominant over photothermal effects (region II in FIG. 1). For irradiation at fluences close to the ablation threshold, voids are nucleated under the irradiated surface. At fluences just above the ablation threshold, subsurface voids can grow and coalesce and pressure build-up can lead to a pressure wave that causes mechanical fracture or spallation of the surface layer. The surface temperature may only slightly exceed the surface temperature. An illustration of this effect is shown in FIGS. 2-4. A bright-field transmission electron micrograph (TEM) of unablated hexanitrostilbene (HNS) is shown in FIG. 2. FIG. 3 presents a bright-field TEM of a crystalline ablation particle, such as one would expect from spallation of the surface layer during ablation in region II of FIG. 1. At still higher fluences, material ejection may result from a combination of stress confinement and phase explosion. The product morphology is expected to be predominantly spheroidal from droplet solidification. FIG. 4 presents a bright-field TEM of a spheroidal particle of HNS.

Figure 5:
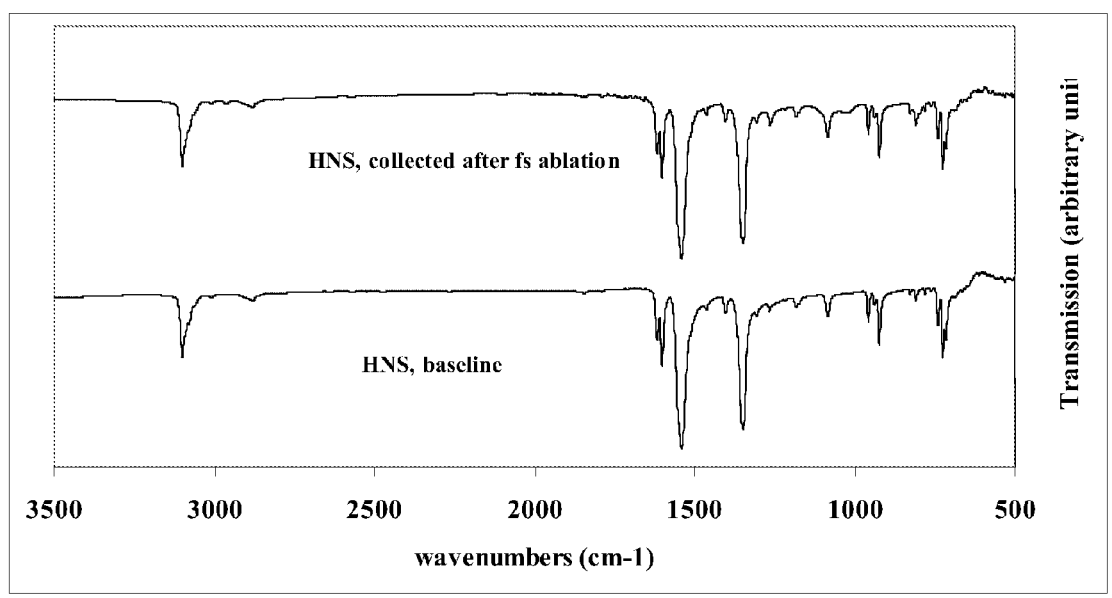
FIG. 5 presents Fourier transform infrared (FTIR) spectra of HNS starting material (labeled baseline) and of HNS nanoparticles (labeled as collected after fs ablation). The identicality of the spectral peaks shows that the nanoparticles have the same chemical composition as the starting material.
Figure 6:
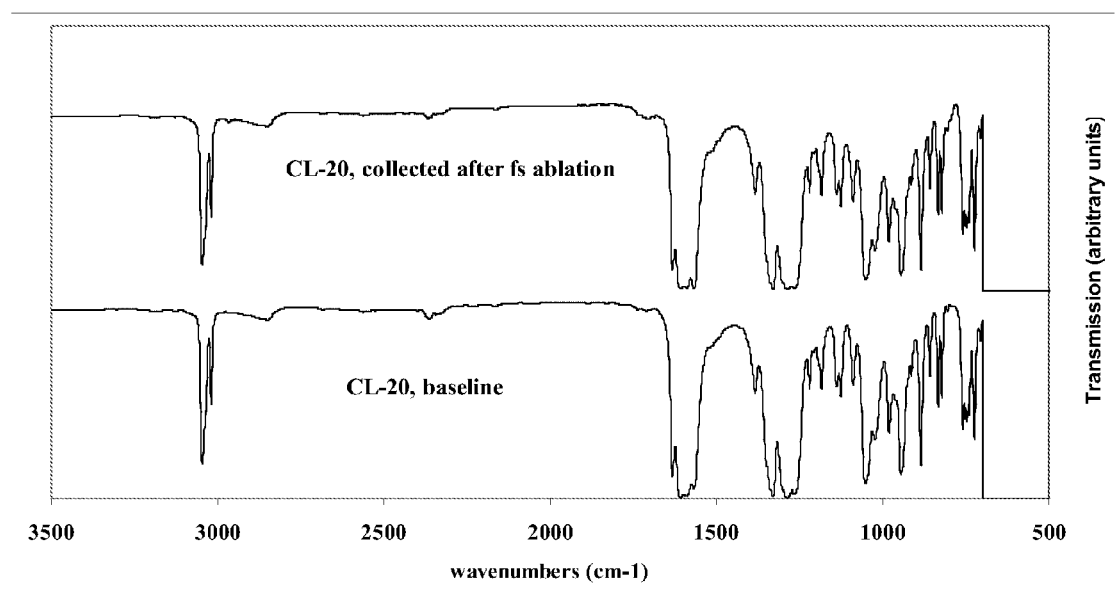
FIG. 6 presents Fourier transform infrared (FTIR) spectra of CL-20 starting material (labeled baseline) and of CL-20 nanoparticles (labeled as collected after fs ablation). The identicality of the spectral peaks shows that the nanoparticles have the same chemical composition as the starting material.

The retention of the chemical identity of the starting material is shown in FIGS. 5 and 6. In FIG. 5, the Fourier transform infrared (FTIR) spectra of both starting material and ablated nanoparticles of HNS are shown. In FIG. 6, the FTIR spectra of starting material and ablated nanoparticles of hexanitrohexaazaisowurtzitane (CL-20) are shown. In both case, the identicality of the spectra show the retention of the chemical identity of the starting material by the ablated nanoparticles.

A wide variety of explosive solids are suitable for applications of embodiments of this invention. Examples include but are not restricted to hexanitrostilbene (HNS), hexanitrohexaazaisowurtzitane (CL-20 or HNIW), pentaerithritoltetranitrate (PETN), 1,3,5,7-Tetranitro-1,3,5,7-tetraazacyclooctane (HMX), 2,6-diamino-3,5-dinitropyrazine-1-oxide (LLM-105), 3-nitro-1,2,4-triazol-5-one (NTO), 1,3,5-Trinito-1,3,5-triazacyclohexane (RDX), 2,4,6-Trinitro-1,3,5-benzene-triamine; triaminotrinitrobenzene (TATB), N-picryl-N-methylnitramine (tetryl), and trinitrotoluene (TNT). Formulation wherein these materials are combined together or with binders or other solids are equally suitable for embodiments of this invention.

The laser operating conditions that are useful for various embodiments of this invention will depend on the detailed chemical behavior of the explosive that is to be machined. Following is a discussion of some of the issues for one skilled in the art to consider in selecting suitable operating parameters for a particular application.

The combination of pulse length and fluence should be chosen to produce ablation without substantially fully ionizing the material and without producing excessive thermal heating of the material that may lead to deflagration or detonation. While operation within portions of region I of FIG. 1 may be suitable for some materials, operation within region II of FIG. 1 should be suitable for most solid explosive materials. The delimiting values of fluence and pulse length can be determined readily. For a given pulse length, one may determine a useful working range of laser fluences by gradually increasing the laser fluence until ablation is observed and particles can be collected. The fluence value may be expected to vary somewhat depending on the material. For some embodiments, fluences between approximately 0.5 and approximately 100 J/cm$^2$ are useful. Table 1 lists some operating parameters that produce nanoparticles for three explosive materials using 800 nm light from a Ti-sapphire laser and a pulse length of 120 fsec. Substantial yields of particles can be produced under these conditions. For example, a yield of 12 mg of particles with the ablative removal of 33 mg of HNS material using a fluence of 10.0 J/cm$^2$.

TABLE 1

Laser parameters for nanoparticle formation

| Material | Fluence (J/cm$^2$) |
|---|---|
| HNS | 19.9 |
| CL-20 | 11.9 |
| PETN | 4 |

Particle sizes in the range of 5 nm to 10 micrometer typically result. Due to the mechanism of particle formation, significant variation in particle sizes may occurs. The range of sizes will depend on the material, the wavelength, the pulse length, and the fluence.

The selection of suitable pulse lengths depends on the temperature sensitivity of the explosive. Longer pulse lengths may heat the material sufficiently to cause deflagration or detonation. It is desirable to stay below that limit, which will depend on the characteristics of the individual explosive and may be determined experimentally. In general, if one operates in the femtosecond pulse range, operation within region II of FIG. 1 should avoid deflagration or detonation problems for most common solid explosives. Operation with laser pulse lengths of a few picoseconds may also be suitable for many materials. Excessive thermal lattice heating may generally avoided in these regimes. For some embodiments, such as those employing Ti-sapphire lasers, pulse lengths between approximately 60 femtoseconds and approximately 200 femtoseconds are useful.

Suitable laser wavelengths will be determined by the light absorption properties of the material. The goal is to select a combination of wavelength, pulse length, and fluence that allow operation predominantly within the photomechanical ablation region. Short wavelength light, such as UV light, is strongly absorbed in the near-surface region of a solid. Longer wavelength light may penetrate more deeply into a material. The location of absorption can affect which mechanism is dominant. The demonstrated embodiments of this invention employed an 800-nm laser with pulse lengths typically between 115 and 125 femtoseconds; however, other combinations may be used provided they produce ablation that is not dominated by plasma formation that decomposes the material or that produces too much lattice heating.

In some embodiments, one may chose to move the beam frequently to a fresh region of the sample surface. Such beam rastering may be achieved by moving the sample surface or by moving the beam. For example, in some embodiments, the source material may be rotated. In some embodiments, rotations rates between 100 and 1000 rpm have been employed; in some embodiments, a rate pf 500 rpm was employed. These rotation rates are not restrictive and many other rotation rates, including no rotation, may be used. Moving the focal point of the beam on the material surface may also be achieved by many different means well known to those skilled in the optical beam steering art.

In different embodiments, different pulse repetition rates may be employed. A higher repetition rate will result in a more rapid total rate of particle production for a given rate of production per pulse. Any upper limit to the useful pulse rate would be determined by whether excessive heating of the source material is occurring. Repetition rates that do not excessively heat the surface may be used.

In different embodiments, different particle collection methods may be employed. Collection may be by line-of-sight flight to a collection surface. This surface may be located at a variety of distances in different embodiments. Collection on a surface near (mm to cm) the point of generation has been demonstrated. Collection on a filter some distance away (cm) from the point of generation has also been demonstrated. The surface may also be located in a non-line-of-sight location. A flowing gas (gas stream) has been used to sweep the particles to a collection surface some distance away (cm) from the point of generation. Other configurations, as may be convenient, can be used in different embodiments.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A process for making nanoscale particles of an energetic material, the process comprising;
    irradiating a surface of an energetic material source with ultrashort-pulse laser radiation, wherein a pulse length of a laser pulse of the ultrashort-pulse laser radiation and a fluence of the laser pulse are selected to avoid forming, as a majority ablation product, a plasma consisting essentially of at least one of elemental constituents and molecular fragments of the energetic material; and
    ejecting nanoscale particles of the energetic material from the surface of the energetic material source by laser ablation.

2. The process of claim 1, wherein the energetic material source is a solid comprising an explosive constituent.

3. The process of claim 2, wherein the explosive constituent is selected from the group consisting of hexanitrostilbene (HNS), hexanitrohexaazaisowurtzitane (CL-20 or HNIW), pentaerithritoltetranitrate (PETN), 1,3,5,7-Tetranitro-1,3,5,7-tetraazacyclooctane (HMX), 2,6-diamino-3,5-dinitropyrazine-1-oxide (LLM-105), 3-nitro-1,2,4-triazol-5-one (NTO), 1,3,5-Trinito-1,3,5-triazacyclohexane (RDX), 2,4,6-Trinitro-1,3,5-benzene-triamine; triaminotrinitrobenzene (TATB), N-picryl-N-methylnitramine (tetryl), and trinitrotoluene (TNT).

4. The process of claim 1, wherein the steps of irradiating and ejecting are performed at a pressure between $10^{-6}$ Torr and 1 atmosphere.

5. The process of claim 1, wherein the steps of irradiating and ejecting are performed in a non-reactive atmosphere.

6. The process of claim 1, wherein the energetic material source is a crystal, a powder, a pressed powder, a pellet, or a film.

7. The process of claim 1, wherein the ultrashort-pulse radiation is rastered on the surface of the energetic material by at least one of moving a beam of the ultrashort-pulse radiation and moving the energetic material source.

8. The process of claim 1, wherein the pulse length of the laser pulse is sufficiently short to prevent a deflagration or a detonation of the energetic material.

9. The process of claim 8, wherein the pulse length of the laser pulse is less than or equal to approximately 200 psec.

10. The process of claim 1, further comprising determining the fluence of the laser pulse suitable for use by initiating the step of irradiating at a fluence below an ablation threshold and increasing the fluence of the laser pulse incrementally to achieve particle production.

11. The process of claim 1, wherein a wavelength of the laser pulse is at least one of a visible wavelength and an infrared wavelength.

12. The process of claim 1, wherein the pulse length is between 60 and 200 femtoseconds, the fluence is between 0.5 and 100 $J/cm^2$, and the laser pulse is a pulse from a Ti-sapphire laser.

13. The process of claim 1, further comprising collecting the nanoscale particles on a collection surface, wherein the nanoscale particles are delivered to the collection surface by line-of-sight flight or by sweeping the nanoscale particles to the collection surface using a gas stream.

* * * * *